UNITED STATES PATENT OFFICE 2,654,758

SUBSTITUTED ETHYLENEDIAMINE DERIVATIVES

Domenick Papa, Brooklyn, Nathan Sperber, Bronx, and Frank Villani, Brooklyn, N. Y., assignors to Schering Corporation, Bloomfield, N. J., a corporation of New Jersey No Drawing. Application August 30, 1948, Serial No. 46,924

14 Claims. (Cl. 260—295)

The present invention relates to a new group of compounds having useful therapeutic activity. More specifically, the invention relates to amide derivatives of organic carboxylic acids of the following general formula:

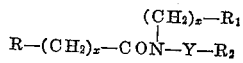

wherein R and $R_1$ are selected from aliphatic, cycloaliphatic, aryl and heterocyclic groups, $x$ is selected from 0, 1 and 2, Y is a saturated aliphatic group containing from 2 to 4 carbon atoms and $R_2$ is a member of the group consisting of dialkylamino, piperidino, morpholino and imidazolinyl groups. The radicals R and $R_1$ in the above general formula may be substituted by lower alkyl groups, lower alkoxy groups, halogen, and basic groups such as amino, dialkylamino, acylamino, and the like.

The compounds of the present invention may be prepared by the condensation of a carbocylic acid chloride or a carboxylic acid ester with the appropriately substituted alkylenediamine derivative. The substituted alkylenediamines are readily available by the condensation of an amine with a dialkylaminoalkyl halide. For example, N,N-dimethyl-N'-phenylethylenediamine is obtained by the condensation of aniline and N,N-dimethylaminoethyl chloride in accordance with known methods. Other amines, such as amylamine, benzylamine, 2-aminopyridine, 2-aminothiazole, and the like can be used in a similar reaction to obtain the desired substituted alkylenediamine. In place of the β-N,N-dimethylaminoethyl chloride, other appropriately substituted amines, such as β-N,N-diethylaminopropyl chloride, β-N-piperidinoethyl chloride, β-N-morpholinoethyl chloride and β-N-imidazolinylethyl chloride can be used.

The compounds of the present invention may be used in the form of tablets into which are incorporated either the free base or its salt. Typical salts which may be used are the hydrochloride, the phosphate, the succinate, the maleate, and the tartrate.

The following examples will illustrate the methods and compounds of the present invention and are not intended to restrict the scope of the invention:

EXAMPLE I

*N,N-dimethyl-N'-picolinoyl-N'-phenylethylenediamine*

Method I.—Thirty-five cc. of thionyl chloride are added slowly with stirring and cooling to 12.3 g. picolinic acid. After ½ hour on the steam bath, the excess thionyl chloride is removed in vacuo. To the resulting picolinoyl chloride hydrochloride, 30 g. triethylamine in 150 cc. dry benzene is added slowly with efficient cooling and stirring then 16.5 g. N,N-dimethyl-N'-phenylethylenediamine in 100 cc. dry benzene is added. The mixture is refluxed for 8–12 hours on the steam bath with stirring. After cooling, the reaction product is poured on ice water, made alkaline with sodium hydroxide and extracted with ether. The ether extracts are extracted with dilute (10%) hydrochloric acid. The acid extracts are made strongly alkaline and the resulting oil extracted with ether. The ether extracts are dried over anhydrous sodium sulfate and the solvent then removed. The residue is distilled and a light yellow viscous oil boiling at 175–180° C. at 2 mm. is obtained.

The picolinamide of this example may also be obtained by method II: A mixture of 15.1 g. ethyl picolinate and 32.8 g. N,N-dimethyl-N'-phenylethylenediamine is heated with stirring at 170–190° C. for 40–60 hours. The resulting mixture is distilled under reduced pressure to yield the amide of this example.

EXAMPLE II

*N,N-dimethyl-N'-nicotinoyl-N'-phenylethylenediamine*

A mixture of 44.3 g. nicotinic acid and 150 ml. thionyl chloride is refluxed on the steam bath for two hours. The excess thionyl chloride is removed in vacuo and to the crystalline residue of nicotinoyl chloride hydrochloride, 200 cc. dry pyridine is added slowly with cooling. Then 64 g. of N,N-dimethyl-N'-phenyl ethylene diamine is added and the mixture refluxed with stirring for 8–12 hours. The excess pyridine is removed in vacuo and the viscous residue is poured on ice and water. The aqueous mixture is made alkaline with sodium hydroxide, extracted with ether and the amide purified as described under method I of Example I. The nicotinoyl amide is obtained as a yellow oil boiling at 174–177° C./0.5 mm.

EXAMPLE III

*N,N-diethyl-N'-nicotinoyl-N'-phenylethylenediamine*

A mixture of 36 g. nicotinoyl chloride (J. Org. Chem. 10, 27 (1945)) and 48 g. of N,N-diethyl-N'-phenylethylenediamine in 200 cc. anhydrous benzene is refluxed with stirring for 18 hours. The mixture is poured on ice water and the amide is isolated by method I of Example I. This amide is also a light yellow viscous oil boiling at 185–190° C./0.5 mm.

This compound may also be made in high yield by the method of Example II.

EXAMPLE IV

*N,N-dimethyl-N'-nicotinoyl-N'-(p-methylphenyl) ethylenediamine*

This compound is prepared by the method of Example II using N,N-dimethyl-N'-(p-methylphenyl) ethylenediamine and nicotinoyl chloride hydrochloride. The amide boils at 180–189° C./0.5 mm. after distillation and melts at 73–73.5° C.

EXAMPLE V

*N,N-dimethyl-N'-nicotinoyl-N'(m-chlorophenyl) ethylenediamine*

This amide is prepared by the method of Example II using N,N-dimethyl-N'-(m-chlorophenyl) ethylenediamine. It boils at 176–185° C./0.5 mm. and melts, after recrystallization from ligroin, at 74–74.5° C.

EXAMPLE VI

*N,N-dimethyl-N'-nicotinoyl-N'-(p-chlorophenyl) ethylenediamine*

By the method of Example II, this amide is obtained from N,N-dimethyl-N'-(p-chlorophenyl) ethylenediamine as a light yellow, viscous oil boiling at 188–192° C./1 mm.

EXAMPLE VII

*N,N-dimethyl-N'-nicotinoyl-N'-(o-methoxyphenyl) ethylenediamine*

Using N,N-dimethyl-N'-(o-methoxyphenyl) ethylenediamine as described in Example II, there is obtained this amide boiling at 185–187° C./1 mm. and melting at 73–74° C. after recrystallization from ligroin.

EXAMPLE VIII

*N,N-dimethyl-N'-nicotinoyl-N'-benzylethylenediamine*

By reacting N,N-dimethyl-N'-benzylethylenediamine in accordance with the procedure of Example II, the amide of this example is obtained as a viscous liquid boiling at 193–197° C./2 mm.

EXAMPLE IX

*N,N-diethyl-N'-nicotinoyl-N'-benzylethylenediamine*

In place of the dimethyl compound of the previous example, N,N-diethyl-N'-benzylethylenediamine is used to obtain the amide of this example. It is a yellow, viscous liquid distilling at 185–190° C./1 mm.

EXAMPLE X

*N,N-dimethyl-N'-nicotinoyl-N'-(p-chlorobenzyl) ethylenediamine*

The condensation of N,N-dimethyl-N'-(p-chlorobenzyl) ethylenediamine and nicotinoyl chloride hydrochloride gives this amide boiling at 190–195° C./1–2 mm.

EXAMPLE XI

*N,N-dimethyl-N'-nicotinoyl-N'-(p-methylbenzyl) ethylenediamine*

By the condensation of the appropriately substituted benzylethylenediamine and nicotinoyl chloride hydrochloride, the amide of this example is obtained as a yellow, viscous oil boiling at 188–190° C./0.5 mm.

EXAMPLE XII

*N,N-dimethyl-N'-nicotinoyl-N'-(p-methoxybenzyl) ethylenediamine*

The N,N-dimethyl-N'-(p-methoxybenzyl) ethylenediamine condensed with nicotinoyl chloride hydrochloride as described in Example II gives this amide boiling at 190–194° C./1 mm.

EXAMPLE XIII

*N,N-dimethyl-N'-picolinoyl-N'-(p-methylphenyl) ethylenediamine*

By condensing N,N-dimethyl-N'-(p-methylphenyl) ethylenediamine with picolinoyl chloride hydrochloride by method I of Example I, there is obtained the amide of this example which distills at 185–189° C./1 mm.

EXAMPLE XIV

*N,N-dimethyl-N'-picolinoyl-N'-(m-chlorophenyl) ethylenediamine*

This amide is prepared from N,N-dimethyl-N'-(m-chlorophenyl) ethylenediamine in accordance with method I of Example I. The amide is a yellow, viscous liquid distilling at 182–186° C./1–2 mm.

EXAMPLE XV

*N,N-dimethyl-N'-picolinoyl-N'-(p-chlorophenyl) ethylenediamine*

By substituting the p-chloro compound for the meta compound of the previous example, this amide is obtained as a viscous liquid which distills at 185–190° C./1–2 mm.

EXAMPLE XVI

*N,N-dimethyl-N'-picolinoyl-N'-(o-methoxyphenyl) ethylenediamine*

By using the o-methoxyphenyl substituted ethylenediamine in accordance with method I of Example I, the amide of this example is obtained boiling at 190–194° C./1–2 mm.

EXAMPLE XVII

*N,N-dimethyl-N'-picolinoyl-N'-benzylethylenediamine*

By using the benzyl substituted ethylenediamine in accordance with method I of Example I, there is obtained the amide of this example boiling at 180–186° C./1 mm.

EXAMPLE XVIII

*N,N-dimethyl-N'-picolinoyl-N'-(p-chlorobenzyl) ethylenediamine*

By using the p-chlorobenzyl substituted ethylenediamine in accordance with method I of Example I, there is obtained the amide of this example which boils at 190–192° C./1–2 mm.

EXAMPLE XIX

*N,N-dimethyl-N'-picolinoyl-N'-(p-methylbenzyl) ethylenediamine*

By using the p-methylbenzyl substituted ethylenediamine in accordance with method I of Example I, there is obtained the amide of this example which boils at 188–192° C./1 mm.

EXAMPLE XX

*N,N-dimethyl-N'-picolinoyl-N'-(p-methoxybenzyl) ethylenediamine*

By using the p-methoxybenzyl substituted ethylenediamine in accordance with method I of Example I, there is obtained the amide of this example boiling at 190–194° C./0.5 mm.

The following further compounds are representative of those within the scope of the present invention. The methods described above can be used in the preparation of these compounds. The intermediate products, namely, the acid chlorides and the unsubstituted amines, are readily available by well-known methods described in the chemical literature.

1. N,N-dimethyl - N' - (2 - methylthienyl) -N'- (6-chloronicotinoyl) -1,2-diaminopropane.
2. N,N-dimethyl-N'-benzyl-N'-2-thenoylethylenediamine.
3. N,N-dimethyl - N' - benzyl-N'-1-naphthoyl-ethylenediamine.
4. N,N-dimethyl-N'-benzyl-N'-(p - chlorobenzoyl) ethylenediamine.
5. N,N-diethyl - N' - benzyl - N' - (4 - methylthenoyl) ethylenediamine.
6. N,N-dimethyl-N'-(p - dimethylaminophenyl) -N'-picolinoylethylenediamine.
7. N,N - dimethyl-N'-benzyl-N'-(tributylacetyl) ethylenediamine.
8. N,N-dimethyl-N'-benzyl - N' - (hexahydrobenzoyl) ethylenediamine.
9. N-benzyl-N-(β-1-piperidinoethyl) coumarilamide.
10. N,N - dimethyl-N'-phenyl-N'-(α-ar-tetrahydronaphthaleneacetyl) ethylenediamine.
11. N,N-dimethyl-N'-(p - methoxyphenyl) -N'-(α-ac-tetrahydronaphthaleneacetyl) ethylenediamine.
12. N-(β-dimethylaminoethyl) - N - benzyl-2-thiazylcarboxamide.
13. N,N-dimethyl-N' -benzyl-N'-furoyl-1,3-diaminopropane.
14. N,N-dimethyl-N'-(2-thiazyl) -N'-nicotinoylethylenediamine.
15. N-(β-dimethylaminoethyl) - N - phenyl-6-methyl-2-pyrazinecarboxamide.
16. N,N - dimethyl-N'-2-pyridyl-N'-nicotinoylethylenediamine.

We claim:
1. Compounds of the group consisting of bases of the formula

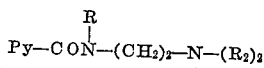

wherein Py is a pyridine ring, R₁ is selected from the group consisting of phenyl, benzyl and the mono- lower alkyl, mono-chloro and mono- lower alkoxy ring substitution products and R₂ is a lower alkyl group, and the non-toxic salts thereof.

2. Compounds of the general formula

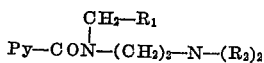

wherein Py is a pyridine ring, R₁ is a phenyl nucleus, and R₂ is a lower alkyl group.
3. Compounds as defined in claim 2 wherein the phenyl nucleus contains one chlorine.
4. Compounds as defined in claim 2 wherein the phenyl nucleus contains one lower alkyl group.
5. Compounds as defined in claim 2 wherein the phenyl nucleus contains one lower alkoxy group.
6. Compounds of the general formula

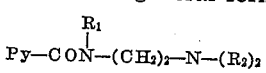

wherein Py is a pyridine ring, R₁ is a phenyl nucleus, and R₂ is a lower alkyl group.
7. Compounds as defined in claim 6 wherein the phenyl nucleus contains one chlorine.
8. Compounds as defined in claim 6 wherein the phenyl nucleus contains one lower alkyl group.
9. Compounds as defined in claim 6 wherein the phenyl nucleus contains one lower alkoxy group.
10. N,N - dimethyl - N' - picolinoyl - N' - phenylethylenediamine.
11. N,N - dimethyl - N' - nicotinoyl - N' - (p - chlorophenyl) ethylenediamine.
12. N,N - dimethyl - N' - picolinoyl - N' - (p - chlorophenyl) ethylenediamine.
13. N,N - dimethyl - N' - nicotinoyl - N' - (p - methylphenyl) -ethylenediamine.
14. N,N - dimethyl - N' - picolinoyl - N' - (p - methylbenzyl) -ethylenediamine.

DOMENICK PAPA.
NATHAN SPERBER.
FRANK VILLANI.

References Cited in the file of this patent

UNITED STATES PATENTS

| Number | Name | Date |
| --- | --- | --- |
| 1,737,458 | Hartman | Nov. 28, 1929 |
| 1,886,481 | Hartman | Nov. 8, 1932 |

OTHER REFERENCES

Gryszkiewicz, Chemical Abstracts, vol. 32, p. 4604.

Wiselogle, "Survey of Antimalarial," p. 497, SN 10950, 1946, vol. II, part 1.